United States Patent [19]

Tanaka et al.

[11] Patent Number: 5,526,263

[45] Date of Patent: Jun. 11, 1996

[54] GRAVITATIONAL ACCELEROMETER PROVIDED WITH ZERO ADJUSTER

[75] Inventors: Hirohisa Tanaka; Kazumi Yasuzumi, both of Itami, Japan

[73] Assignee: Sumitomo Electric Industries, Ltd., Osaka, Japan

[21] Appl. No.: 353,238

[22] Filed: Dec. 2, 1994

[30] Foreign Application Priority Data

Dec. 9, 1993 [JP] Japan ................................ 5-308949

[51] Int. Cl.$^6$ ............................................. G01P 21/00
[52] U.S. Cl. ........................... 364/426.01; 364/426.02; 364/566; 364/571.02; 73/1 D
[58] Field of Search ......................... 364/426.01, 426.02, 364/566, 571.01, 571.02, 571.04, 571.07; 73/1 D, 9, 488, 504, 507, 511, 512, 517 R; 235/150.27; 303/21 BE, 109, 103; 246/182 B; 180/141

[56] References Cited

U.S. PATENT DOCUMENTS

| | | | |
|---|---|---|---|
| 3,824,386 | 7/1974 | Offereins | 235/150.27 |
| 3,904,251 | 9/1975 | Hikida et al. | 303/21 BE |
| 3,916,697 | 11/1975 | Ludlum | 73/504 |
| 4,003,241 | 1/1977 | Thomas | 73/9 |
| 4,033,635 | 7/1977 | Montoya | 303/109 |
| 4,089,564 | 5/1978 | Oberg | 303/109 |
| 4,245,510 | 1/1981 | Baker | 73/517 R |
| 4,410,154 | 10/1983 | Matty | 246/182 B |
| 4,832,149 | 5/1989 | Degonde | 180/141 |
| 4,852,950 | 8/1989 | Murakami | 303/100 |
| 5,176,431 | 1/1993 | Strehler | 303/103 |
| 5,208,754 | 5/1993 | Nakaura et al. | 364/426.01 |
| 5,307,274 | 4/1994 | Takata et al. | 364/426.01 |

FOREIGN PATENT DOCUMENTS

| | | |
|---|---|---|
| 205277 | 12/1986 | European Pat. Off. . |
| 492642 | 7/1992 | European Pat. Off. . |
| 496252 | 7/1992 | European Pat. Off. . |
| 4-223275 | 8/1992 | Japan . |
| 91/04892 | 4/1991 | WIPO . |

OTHER PUBLICATIONS

European Search Report and Annex.

*Primary Examiner*—Kevin J. Teska
*Assistant Examiner*—Russell W. Frejd
*Attorney, Agent, or Firm*—Greenblum & Bernstein

[57] ABSTRACT

A gravitational accelerometer for use in an automotive vehicle includes a plurality of wheel speed sensors for outputting a wheel speed by measuring a rotational speed of at least one of vehicle wheels, an acceleration sensor for detecting and outputting an acceleration Am applied to the automotive vehicle, an estimated vehicle acceleration computing unit for computing and outputting an estimated vehicle acceleration Aw estimated from the wheel speed, and a correction quantity computing unit for computing variable correction quantity Ao for each calculation cycle. A horizontal road surface detection unit is provided to detect a generally horizontal road surface. A horizontal correction quantity storage stores and outputs a horizontal correction quantity AoH, which is a correction quantity with respect to the generally horizontal road surface, in response to an output from the horizontal road surface detection unit. A zero correction unit corrects the acceleration Am based on the correction quantity Ao or the horizontal correction quantity AoH to compute a corrected acceleration Ac.

20 Claims, 16 Drawing Sheets

Fig. 4A
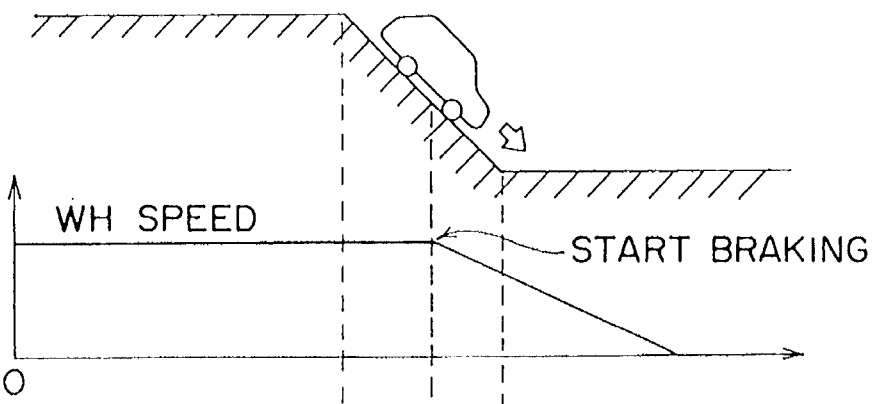
Fig. 4B
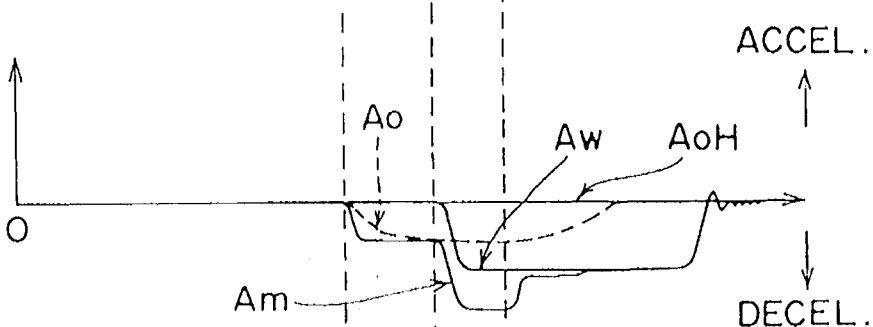
Fig. 4C
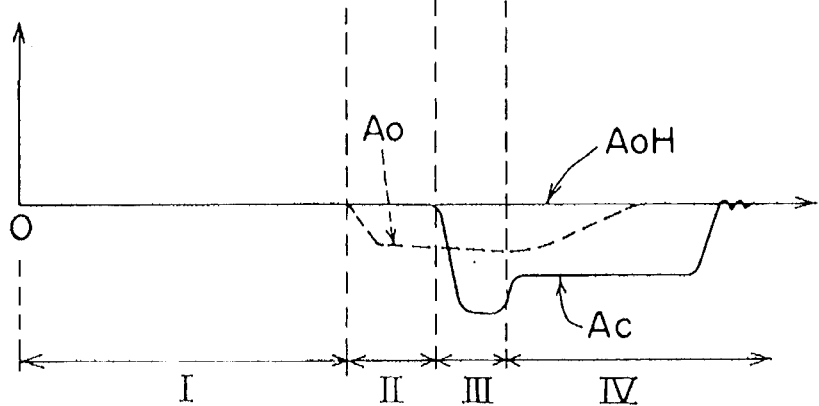
Fig. 4D

GRAVITATIONAL ACCELEROMETER PROVIDED WITH ZERO ADJUSTER

BACKGROUND OF THE INVENTION

1. Field of the Invention

The present invention relates generally to a gravitational accelerometer for use in calculating an estimated vehicle speed of an automotive vehicle, and more particularly to a gravitational accelerometer provided with a zero adjuster or zero correction unit.

2. Description of Related Art

In a wheel behavior control apparatus for anti-locking, etc., estimation of the vehicle speed which is the basis for computing slippage or spin, and that of the coefficient of friction between tires and the road surface, are important factors on which the control performance is directly depends. The estimation of the coefficient of friction between the tires and the road surface is normally calculated from an estimated value of the vehicle acceleration reached during control, and the estimated value of the vehicle acceleration is computed based on the estimated value of the vehicle speed. Accordingly, the performance of the vehicle behavior control apparatus greatly depends on the accuracy of the estimated vehicle speed.

Incidentally, if the vehicle speed is estimated only from the wheel speed, the accuracy in the estimation is markedly deteriorated when an excessive slippage or spin takes place on the wheels.

Therefore, if the estimated vehicle speed and acceleration are obtained based on the information of both the acceleration detected by a reliable accelerometer and the wheel speed, the accuracy in the estimation can be remarkably improved. For the accelerometer, a gravitational accelerometer is generally employed.

However, as schematically shown in FIG. 15, although the acceleration sensor of the gravitational accelerometer is arranged to convert the amount of displacement of a weight or pendulum F arising from acceleration, into electrical signals by using resistors, piezoelectric elements, differential transformers, etc. for detection of acceleration, it is difficult to avoid influences due to fixing accuracy, and somewhat long-term variations such as electrical drifts and gain fluctuation, etc., as well as influences due to inclination or gradient of road surface in principle.

Accordingly, when the gravitational accelerometer is employed, it becomes important how to effect the zero point correction and sensitivity correction including correction of the road surface inclination.

With respect to the above problem, there has conventionally been proposed a zero adjuster or zero correction unit for the gravitational accelerometer, for example, in Japanese Laid-Open Patent Publication (unexamined) No. 4-223275.

The zero adjuster of the gravitational accelerometer as referred to above first finds a difference between the vehicle acceleration Aw estimated from the wheel speed and the acceleration Ac obtained by the gravitational accelerometer after the correction, and subsequently outputs a correction quantity Ao for this cycle by adding to or subtracting from a correction quantity obtained in a previous cycle, a value as obtained through multiplication of the above difference by a correcting speed. Using the correction quantity Ao, the acceleration obtained by the gravitational accelerometer for the present cycle or next cycle is to be corrected.

FIG. 17A shows the state in which an automotive vehicle provided with the conventional gravitational accelerometer as described above and travelling or running at a constant speed, starts braking in the course of a downhill, and stops on a generally horizontal road continued to the downhill. FIG. 17B shows variation of the wheel speed. FIG. 17C represents variations of the vehicle acceleration Aw estimated from the wheel speed, acceleration Am based on the gravitational accelerometer, and the variable correction quantity Ao obtained for each cycle. FIG. 17D denotes variation of the acceleration Ac obtained from the gravitational accelerometer after correction by using the correction quantity Ao.

In FIGS. 17A–17D, a region I shows the state in which the vehicle is travelling or running on a horizontal road at a constant speed, a region II the state in which the vehicle is running on a downhill at a constant speed, a region III the state in which the vehicle is running on the downhill while braking, and a region IV the state in which the vehicle runs and stops on a horizontal road while braking.

Here, when the zero adjuster of the conventional gravitational accelerometer as described above is used, in the case where the vehicle travelling on the downhill while braking again reaches the horizontal road, and runs on the horizontal road while braking as it is, i.e., in the region IV, the correction quantity Ao does not immediately fall to zero, but reaches zero after a considerable delay, as shown in FIG. 17C, in spite of the fact that the road is of the horizontal road in the region IV.

Therefore, as shown by an arrow Z in FIG. 17D, the acceleration Ac of the gravitational accelerometer corrected by using the correction quantity Ao is calculated and outputted to be undesirably small in the direction of speed reduction, and since control of a low friction coefficient (the friction coefficient is represented as μ hereinafter) is effected during this period, the braking force becomes insufficient, resulting in such an inconvenience as an increase of the stopping distance.

As described above, the zero adjuster of the conventional gravitational accelerometer follows the variation of the zero point comparatively quickly generally during running at a constant speed or in the absence of slippage or spin, but the follow-up becomes slow, for example, during braking on the way of a downhill, thus giving rise to such a problem as the increase of the stopping distance as referred to above.

SUMMARY OF THE INVENTION

The present invention has been developed to overcome the above-described disadvantages.

It is accordingly an objective of the present invention to provide an improved gravitational accelerometer for an automotive vehicle, which is capable of effecting more accurate control of the vehicle by achieving acceleration with a high follow-up accuracy for zero correction with respect to rapid variations in the inclination of a road surface or during braking in the course of a downhill or the like.

Another objective of the present invention is to provide the gravitational accelerometer of the above-described type, which is stable and reliable in functioning, and can be readily incorporated into automotive vehicles of various types at a low cost.

In accomplishing the above and other objectives, the gravitational accelerometer according to the present invention comprises a wheel speed output means for outputting the wheel speed by measuring the rotational speed of at least one of vehicle wheels, an acceleration detection means for detecting and outputting an acceleration Am applied to the automotive vehicle, an estimated vehicle acceleration output means for outputting; an estimated vehicle acceleration Aw estimated from the wheel speed, a correction quantity computing means for computing variable correction quantity Ao for each calculation cycle, and a road surface state detection means for detecting a generally horizontal road surface. A horizontal correction quantity output means is provided for outputting a horizontal correction quantity AoH, which is a correction quantity with respect to the generally horizontal road surface, in response to an output from the road surface state detection means. A zero correction means corrects the acceleration Am based on one of the correction quantity Ao and the horizontal correction quantity AoH to compute a corrected acceleration Ac.

By the above-described construction, the generally horizontal road surface is detected by the road surface state detection means in order to compute the horizontal correction quantity AoH, and during running at a constant speed or when no slippage or spin takes place, the correction quantity Ao is calculated for each specific cycle from the difference between the vehicle acceleration Aw estimated from the wheel speed and the acceleration Ac obtained from the acceleration detection means after the correction. Furthermore, the correction quantity Ao computed for each specific cycle is corrected by adding or subtracting it to or from the acceleration Am obtained from the acceleration detection means. By so doing, in the case of braking in the course of a downhill or in the case where slippage or spin is taking place, the acceleration Am obtained from the acceleration detection means is corrected using the above horizontal correction quantity AoH instead of the correction quantity Ao.

Conveniently, the acceleration detection means detects the acceleration Am applied to the automotive vehicle from an amount of displacement of a weight accommodated therein.

The horizontal correction quantity output means may be replaced by a storage means that stores the correction quantity Ao with respect to the generally horizontal road surface as the horizontal correction quantity AoH in response to an output from the road surface state detection means.

In this case, the acceleration Am obtained from the acceleration detection means is corrected using the horizontal correction quantity AoH read out of the storage means.

Preferably, the road surface state detection means judges to have detected the generally horizontal road surface, when the estimated vehicle acceleration Aw is smaller than a predetermined upper limit value and a differential value of the correction quantity Ao is smaller than a predetermined upper limit value, and when a state in which the correction quantity Ao is greater than the horizontal correction quantity AoH stored in the storage means in a previous cycle has continued for a predetermined period of time, to thereby store the correction quantity Ao at that time in the storage means as a new horizontal correction quantity AoH.

Alternatively, the road surface state detection means judges to have detected the generally horizontal road surface, when a state in which the correction quantity Ao is smaller than the horizontal correction quantity AoH stored in the storage means in a previous cycle has continued for a predetermined period of time.

During braking, the zero correction means compares the correction quantity Ao with the horizontal correction quantity AoH and selects the greater quantity for addition to or substraction from the acceleration Am, to thereby compute the corrected acceleration Ac.

At the starting of braking, when the horizontal correction quantity AoH is greater than the correction quantity Ao, the horizontal correction quantity AoH at that time is set to be the correction quantity Ao.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 4A is a schematic view of an automotive vehicle having the gravitational accelerometer of FIG. 1 and travelling substantially at a constant speed, which vehicle starts braking in the course of a downhill and stops on a generally horizontal road continued to the downhill;

FIG. 4B is a diagram indicating wheel speed variation;

FIG. 4C is a diagram indicating variation in the estimated vehicle acceleration, variation in the acceleration detected by a gravitational acceleration sensor, and variations in the correction quantity obtained for each cycle;

FIG. 4D is a diagram indicating variation in the acceleration obtained from the corrected gravitational acceleration sensor;

DETAILED DESCRIPTION OF THE PREFERRED EMBODIMENTS

Figure 1:
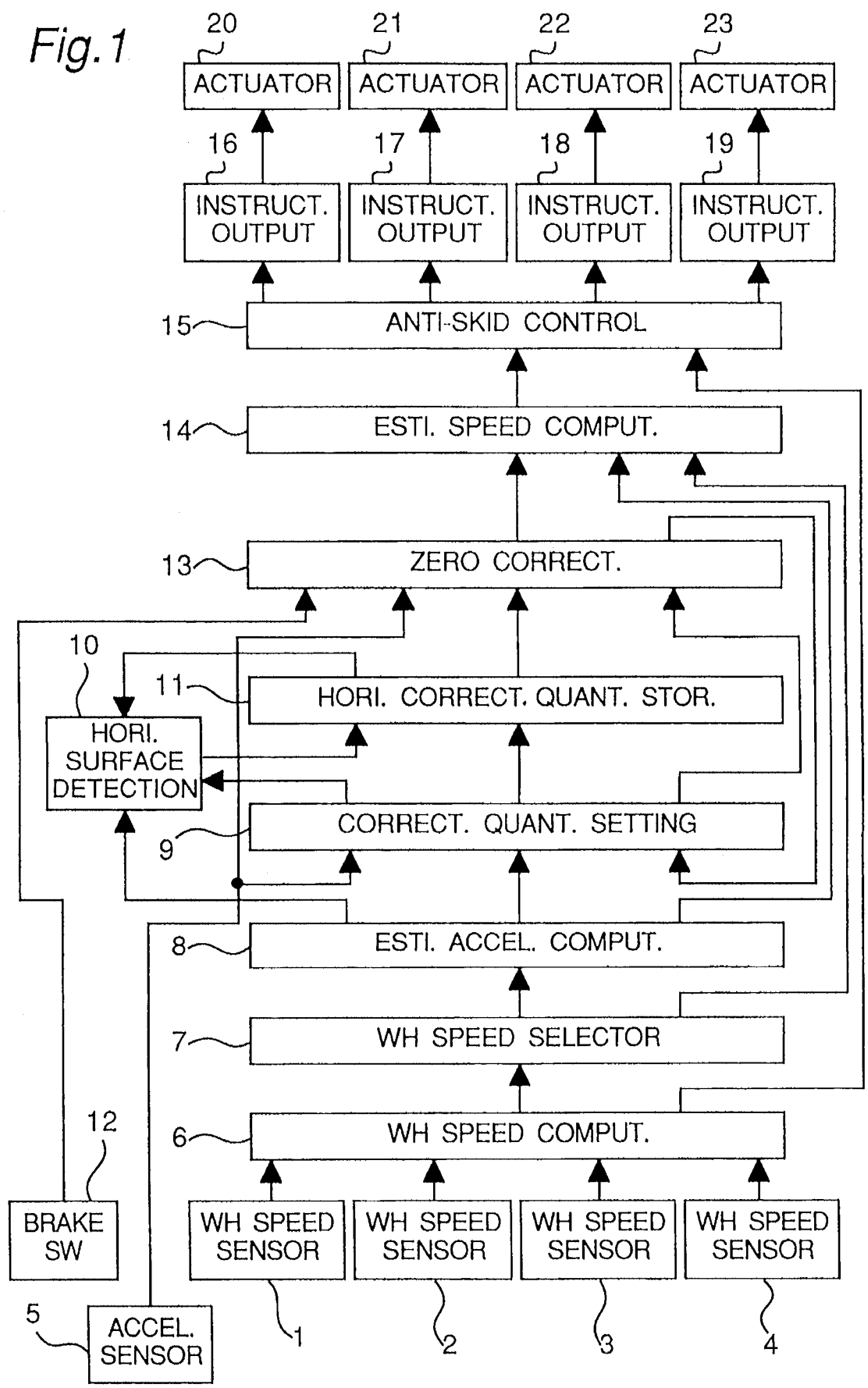
FIG. 1 is a block diagram of an anti-skid control apparatus provided with a gravitational accelerometer according to a first embodiment of the present invention.

Referring now to the drawings, there is shown in FIG. 1 a block diagram of an anti-skid control apparatus in which a gravitational accelerometer according to the present invention is incorporated. The illustrated anti-skid control apparatus is applied to, for example, a four-wheel automotive vehicle.

Figure 15:
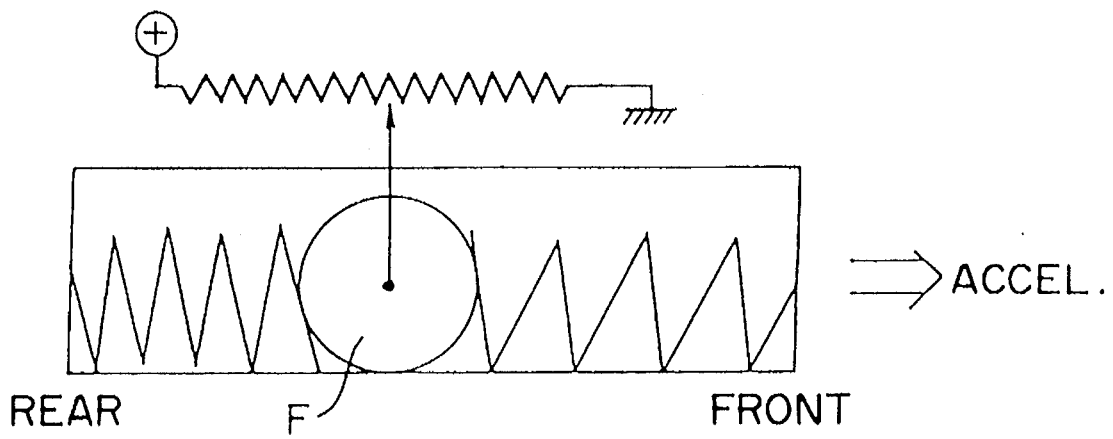
FIG. 15 is a schematic diagram of a conventional gravitational acceleration sensor in which an output voltage is increased upon acceleration.

As shown in FIG. 1, the anti-skid control apparatus comprises a plurality of, for example, four in the illustrated embodiment, wheel speed sensors 1, 2, 3, and 4 for detecting the speed of associated wheels, an acceleration sensor 5 for detecting and outputting the rate of acceleration applied to the vehicle body, and a wheel speed computing unit 6 for computing the wheel speed of each of the four wheels based on output signals from the wheel speed sensors 1–4. The acceleration sensor 5 is comprised of a gravitational acceleration sensor such as shown in FIG. 15 wherein the application of an acceleration thereto increases the output voltage thereof.

The anti-skid control apparatus also comprises a wheel speed selector 7 for appropriately selecting any one of the maximum speed, minimum speed and average speed from among the four wheel speeds according to the running conditions, an estimated vehicle acceleration computing unit 8 for computing an estimated acceleration Aw of the vehicle body based on the wheel speed selected by the wheel speed selector 7, and a correction quantity setting unit 9 for computing a correction quantity Ao required to set the accelerometer to zero.

A horizontal road surface detection unit 10 is provided for detecting the horizontal state of the road surface and accommodates two timers (not shown): a first timer for counting the state wherein the correction quantity Ao is greater than a horizontal correction quantity AoH; and a second timer for counting the state wherein the correction quantity Ao is equal to or smaller than the horizontal correction quantity AoH. When the horizontal road surface has been detected by the horizontal road surface detection unit 10, the correction quantity Ao at that time is stored as the horizontal correction quantity AoH in a horizontal correction quantity storage 11. A zero correction unit 13 is provided for computing a corrected acceleration Ac by correcting an acceleration inputted thereto from the acceleration sensor 5. This correction depends upon the ON-OFF state of a brake switch 12, which is turned on when the brake is applied to the vehicle body.

The anti-skid control apparatus further comprises an estimated vehicle speed computing unit 14 for computing an estimated vehicle speed, an anti-skid control unit 15 for outputting anti-lock control signals upon discrimination of locking symptoms of the wheels, a plurality of (four in the illustrated embodiment) instruction output units 16, 17, 18, and 19 for outputting signals required to control braking pressures based on the anti-lock control signals, and a plurality of (four in the illustrated embodiment) actuators 20, 21, 22, and 23 for driving associated solenoids.

Signals from the wheel speed sensors 1–4 are inputted to the wheel speed computing unit 6 for computation of respective wheel speeds. The wheel speeds computed by the wheel speed computing unit 6 are inputted to the wheel speed selector 7, which in turn selects an appropriate wheel speed according to the current situation. The wheel speeds computed by the wheel speed computing unit 6 are also inputted to the anti-skid control unit 15.

The wheel speed selected by the wheel speed selector 7 is inputted to the estimated vehicle acceleration computing unit 8, which in turn computes an estimated acceleration Aw of the vehicle body based on the wheel speed inputted thereto from the wheel speed selector 7. The wheel speed selected by the wheel speed selector 7 is also inputted to the estimated vehicle speed computing unit 14.

The estimated vehicle acceleration Aw computed by the estimated vehicle acceleration computing unit 8 is inputted to the correction quantity setting unit 9, to the horizontal road surface detection unit 10, and to the estimated vehicle speed computing unit 14. The acceleration Am detected by the acceleration sensor 5 is inputted to the correction quantity setting unit 9 and to the zero correction unit 13.

The correction quantity setting unit 9 computes the correction quantity Ao based on the corrected acceleration Ac computed by the zero correction unit 13 in the previous operation cycle, in addition to the acceleration Am inputted thereto from the acceleration sensor 5 and the estimated vehicle acceleration Aw inputted thereto from the estimated vehicle acceleration computing unit 8. The correction quantity Ao computed by the correction quantity setting unit 9 is inputted to the horizontal road surface detection unit 10, to which the horizontal correction quantity AoH stored in the horizontal correction quantity storage 11 in the previous cycle is also inputted. Based on the inputted data, when the horizontal road surface detection unit 10 has detected the horizontal road surface state, the correction quantity Ao at that time is stored in the horizontal correction quantity storage 11.

The zero correction unit 13 performs a correction with respect to the acceleration Am inputted thereto from the acceleration sensor 5 by allowing either the correction quantity Ao from the correction quantity setting unit 9 or the horizontal correction quantity AoH from the horizontal correction quantity storage 11 to be inputted thereto, depending on whether an ON-signal, i.e., a braking signal, from the brake switch 12 is inputted thereto.

The estimated vehicle speed computing unit 14 computes the estimated vehicle speed based on either the estimated vehicle acceleration Aw computed by the estimated vehicle acceleration computing unit 8 or the corrected acceleration Ac computed by the zero correction unit 13, and a selected wheel speed Vr from the wheel speed selector 7. The estimated vehicle speed computed by the estimated vehicle speed computing unit 14 is inputted to the anti-skid control unit 15.

The anti-skid control unit 15 discriminates the locking symptoms of the wheels based on the wheel speeds inputted thereto from the wheel speed computing unit 6 and the estimated vehicle speed inputted thereto from the estimated vehicle speed computing unit 14, and outputs the anti-lock control signals to the instruction output units 16–19.

Upon receiving the anti-lock control signals from the anti-skid control unit 15, the instruction output units 16–19 output to associated actuators 20–23 respective signals required to control the braking pressures.

The zero correction performed by the gravitational accelerometer incorporated in the anti-skid control apparatus shown in FIG. 1 is explained hereinafter with reference to flow-charts of FIGS. 2 and 3.

Figure 2:
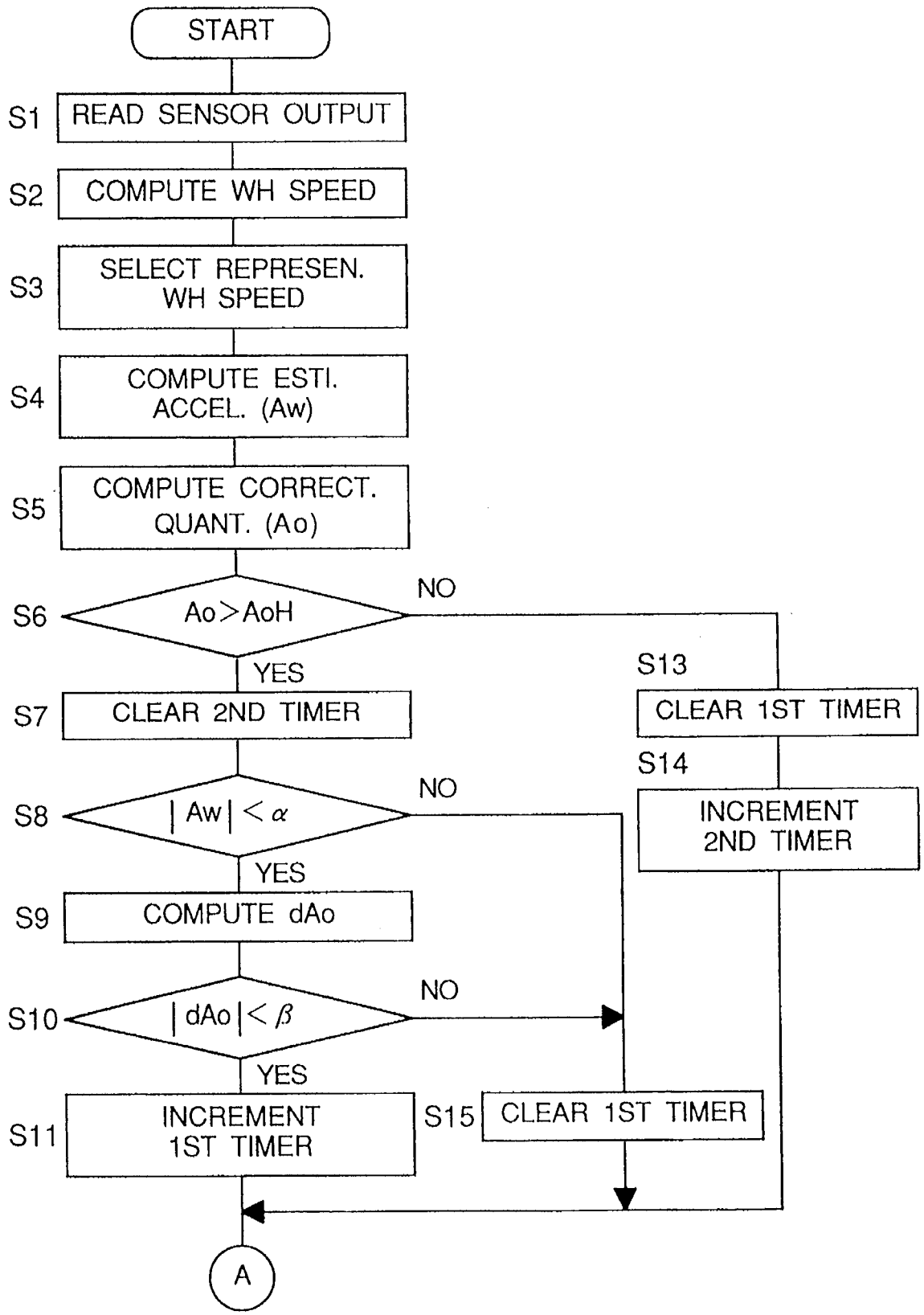
FIGS. 2 and 3 are flow-charts indicating functioning of the gravitational accelerometer of FIG. 1.

As shown in a flow-chart of FIG. 2, the output Am from the acceleration sensor 5 is first read at step S1, followed by step S2 at which the wheel speeds are computed based on the outputs from the wheel speed sensors 1–4. The representative wheel speed Vr is selected at step S3, followed by step S4 at which the estimated vehicle acceleration Aw is computed based on the selected wheel speed Vr.

At step S5, the correction quantity setting unit 9 computes the correction quantity Ao required for the zero adjustment of the gravitational accelerometer. A detailed description of a calculation method of the correction quantity Ao is omitted because such a method is known in, for example, Japanese Laid-open Patent Publication (unexamined) No. 4-223275.

Subsequent steps S6 to S16 indicate a flow wherein the horizontal road surface detection unit 10 detects the horizontal road surface.

At step S6, the correction quantity Ao is compared with the horizontal correction quantity AoH stored in the horizontal correction quantity storage 11. If the correction quantity Ao is greater than the horizontal correction quantity AoH, the second timer is cleared to zero at step S7. The horizontal correction quantity AoH used at step S6 is a value stored in the horizontal correction quantity storage 11 in the previous cycle.

At step S8, the absolute value |Aw| of the estimated vehicle acceleration Aw is compared with a predetermined value $\alpha$, which is a sufficiently small one with which it can be determined that the vehicle body travels substantially at a constant speed. If the absolute value |Aw| of the estimated vehicle acceleration is smaller than the predetermined value $\alpha$, the difference dAo between the correction quantity computed in the previous cycle and that computed in the current cycle is computed at step S9.

At step S10, the absolute value |dAo| of the difference dAo computed at step S9 is compared with a predetermined value $\beta$, which is considered to be a sufficiently small one indicating no substantial change in inclination of the road surface. If the absolute value |dAo| is smaller than the predetermined value $\beta$, the first timer is incremented by 1 at step S11.

Figure 3:
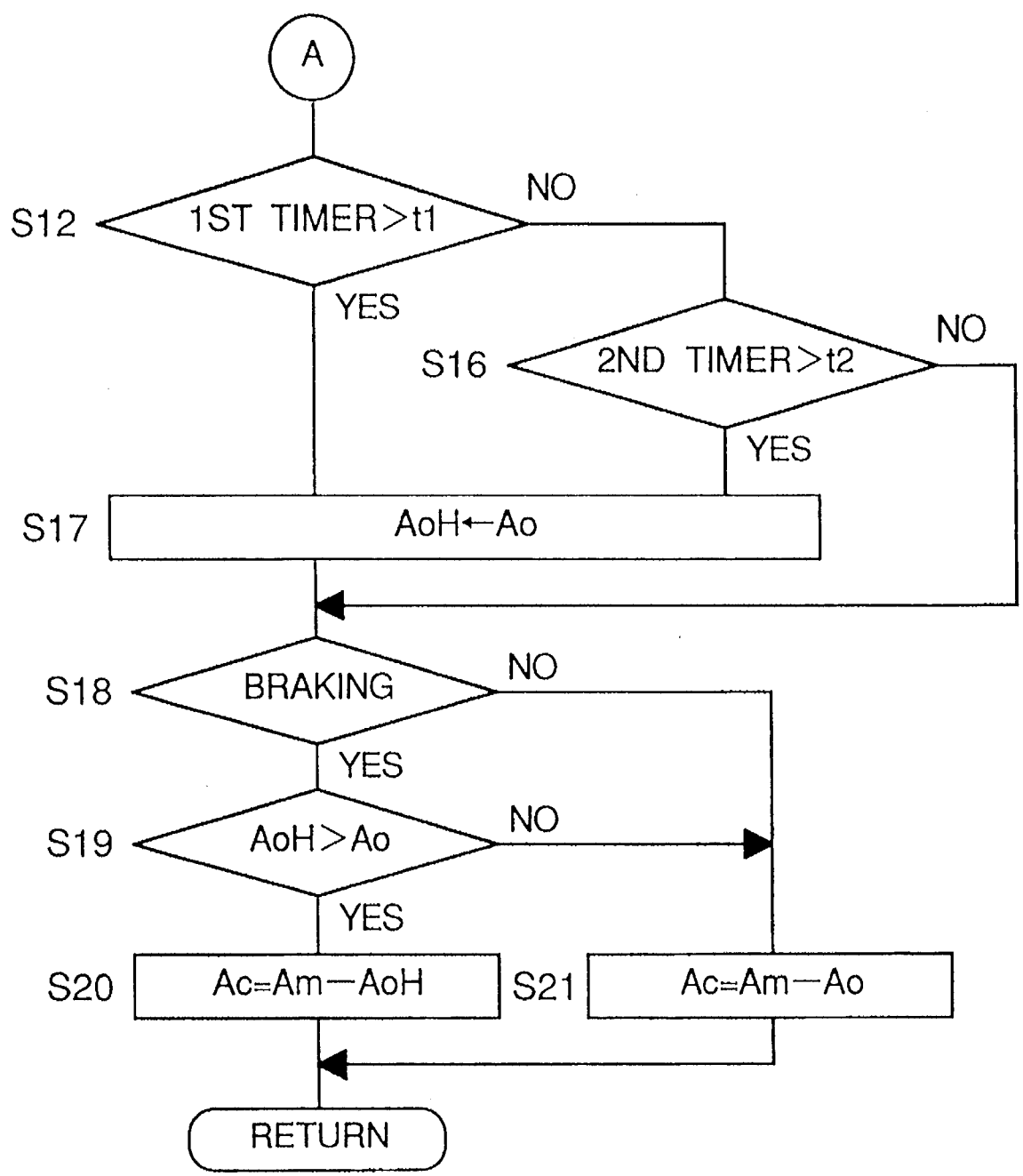

At step S12 in FIG. 3, the counted value of the first timer is compared with a predetermined value t1. If the counted value of the first timer is greater than the predetermined value t1, the correction quantity Ao at that time is stored as the horizontal correction quantity AoH in the horizontal correction quantity storage 11 (step S17).

Returning to step S6 in FIG. 2, if the correction quantity Ao is smaller than the horizontal correction quantity AoH stored in the horizontal correction quantity storage 11, the procedure advances to step S13 at which the first timer is cleared to zero. Then, the second timer is incremented by 1 at step S14, and the procedure advances to step S12 in FIG. 3.

At step S8, if the absolute value |Aw| of the estimated vehicle acceleration is equal to or greater than the predetermined value $\alpha$, the procedure advances to step S15 at which the first timer is cleared to zero. Then, the procedure advances to step S12. Likewise, at step S10, if the absolute value |dAo| is equal to or greater than the predetermined value $\beta$, the procedure advances to step S15.

At step S12 in FIG. 3, if the counted value of the first timer is equal to or smaller than the predetermined value t1, the procedure advances to step S16 at which the counted value of the second timer is compared with a predetermined value t2. If the counted value of the second timer is greater than the predetermined value t2, the procedure advances to step S17. In contrast, if the former is equal to or smaller than the latter, the procedure advances to step S18.

Subsequent steps S18 to S21 indicate a flow wherein the zero correction unit 13 computes the corrected acceleration Ac.

At step S18, a determination is made whether the braking signal from the brake switch 12 is inputted to the zero correction unit 13. If the braking signal is inputted to the zero correction unit 13, i.e., if the brake is applied to the vehicle body, the horizontal correction quantity AoH stored in the horizontal correction quantity storage 11 is compared with the correction quantity Ao (step S19). If the horizontal correction quantity AoH is greater than the correction quantity Ao, the procedure advances to step S20 at which the corrected acceleration Ac is obtained by subtracting the horizontal correction quantity AoH from the acceleration Am detected by the acceleration sensor 5, thus terminating this flow.

At step S18, if no brake is applied to the vehicle body, the procedure advances to step S21 at which the corrected acceleration Ac is obtained by subtracting the correction quantity Ao at that time from the acceleration Am detected by the acceleration sensor 5, thus terminating this flow. Likewise, if the correction quantity Ao is equal to or greater than the horizontal correction quantity AoH stored in the horizontal correction quantity storage 11, the procedure advances to step S21.

It is to be noted that if it is desired to employ an expression to add the horizontal correction quantity AoH at step S20 and an expression to add the correction quantity Ao at step S21, exactly the same thing may be represented by:

Ac=Am+AoH and Ac=Am+Ao, respectively.

FIG. 4A depicts an automotive vehicle having the above-described gravitational accelerometer of the present invention and travelling substantially at a constant speed, which vehicle starts braking in the course of a downhill and stops on a generally horizontal road continued to the downhill. FIG. 4B depicts wheel speed variation. FIG. 4C depicts variation in the vehicle acceleration Aw estimated from the wheel speed, variation in the acceleration Am detected by the gravitational acceleration sensor, and variations in the correction quantity Ao and the horizontal correction quantity AoH obtained for each cycle. FIG. 4D depicts variation in the acceleration Ac obtained from the corrected gravitational acceleration sensor.

In FIGS. 4A–4D, a region denoted by I indicates the state in which the vehicle is travelling on a generally horizontal road substantially at a constant speed, a region denoted by II indicates the state in which the vehicle is travelling on the downhill substantially at the constant speed, a region denoted by III indicates the state in which the vehicle is travelling on the downhill while the brake is being applied thereto, and a region denoted by IV indicates the state in which the vehicle is travelling on a generally horizontal road and eventually stops while the brake is being applied thereto.

According to the present invention, the travelling on the horizontal road surface is detected by the horizontal road surface detection unit 10, and the horizontal correction quantity AoH for the travelling on the horizontal road surface is stored in the horizontal correction quantity storage 11. When the brake is being applied to the vehicle, if the horizontal correction quantity AoH stored in the horizontal correction quantity storage 11 at that time is greater than the correction quantity Ao, the corrected acceleration Ac is obtained by subtracting the horizontal correction quantity AoH from the acceleration Am detected by the acceleration sensor 5.

More specifically, as shown in FIG. 4C, when the vehicle travels on the downhill and subsequently on the generally horizontal road with the brake applied continuously thereto, the correction quantity Ao does not immediately become zero but becomes zero with a considerable delay, for example, in the region IV.

In view of this, as shown in FIG. 4D, when the vehicle travels on the downhill with no brake applied thereto, for example, in the region II, a weight or pendulum F accommodated in the acceleration sensor 5 displaces forwardly under the influence of gravity and, hence, the output value of the acceleration sensor 5 becomes smaller than the actual vehicle acceleration. Accordingly, the corrected acceleration Ac is computed by subtracting the correction quantity Ao from the acceleration Am detected by the acceleration sensor 5. On the other hand, when the brake is being applied to the vehicle, for example, in the regions III and IV, the corrected acceleration Ac is computed by subtracting the horizontal correction quantity AoH stored in the horizontal correction quantity storage 11, instead of the correction quantity Ao, from the acceleration Am detected by the acceleration sensor 5.

Figure 17A:
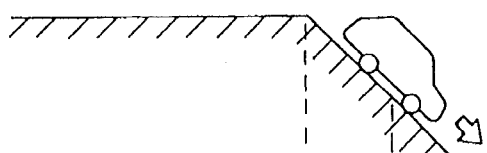
FIG. 17A is a view identical to FIG. 4A, but indicating an automotive vehicle having a conventional gravitational accelerometer.
Figure 17B:
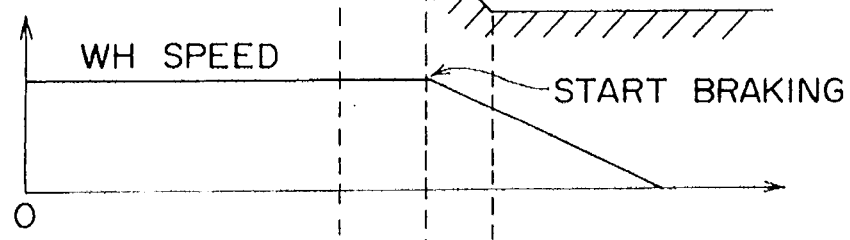
FIGS. 17B, 17C, and 17D are diagrams similar to FIGS. 4B, 4C, and 4D, respectively, but indicating influences on the conventional gravitational accelerometer.
Figure 17C:
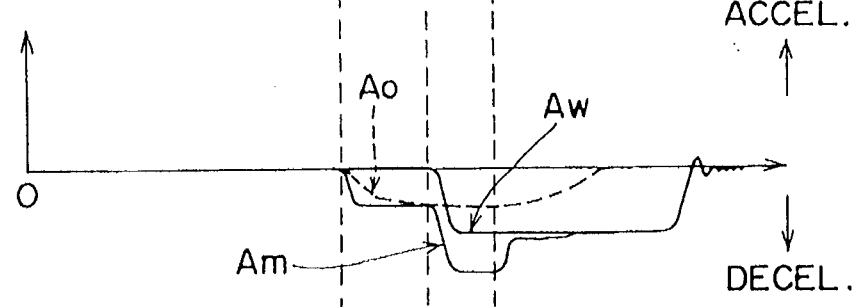
Figure 17D:
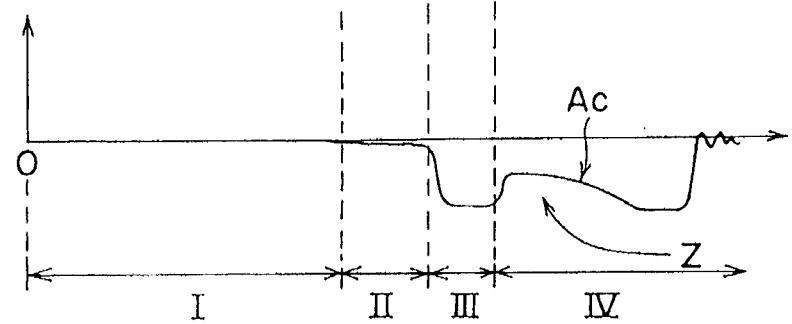

The acceleration Ac after the correction computed in the above described manner will be as shown in FIG. 4D, and thus, there is no possibility that the corrected acceleration Ac by the acceleration sensor 5 as shown in an arrow Z in FIG. 17D is undesirably computed to be small in the direction of speed reduction, and such inconveniences that control in the low μ is effected during this period, resulting in insufficient braking force and consequent extension of the stopping distance, etc. can be advantageously eliminated.

Moreover, in the case where the lowering of the output in the direction of speed reduction for the corrected acceleration Ac at the portion of the arrow Z in FIG. 17D is small, i.e. when the slope of the downhill is gentle, and the undesirable increase of stopping distance does not take place even if the correction is effected by using the correction quantity Ao, the corrected acceleration Ac may be computed by subtracting the correction quantity Ao from the acceleration Am based on the acceleration sensor 5.

Figure 16:
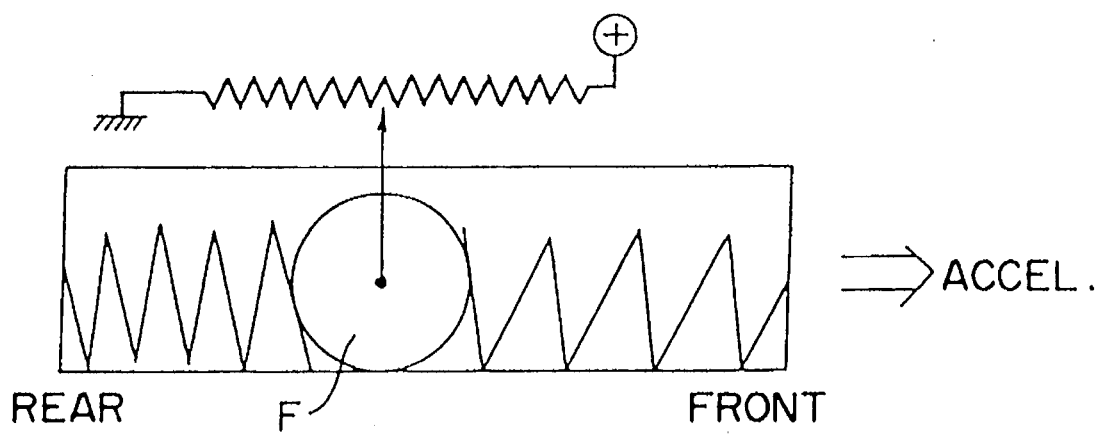
FIG. 16 is a schematic diagram of another conventional gravitational acceleration sensor in which an output voltage is reduced upon acceleration.

Here, for the acceleration sensor 5, there may be considered a gravitational acceleration sensor as shown in FIG. 16 in which the output voltage is reduced upon acceleration.

Figure 5:
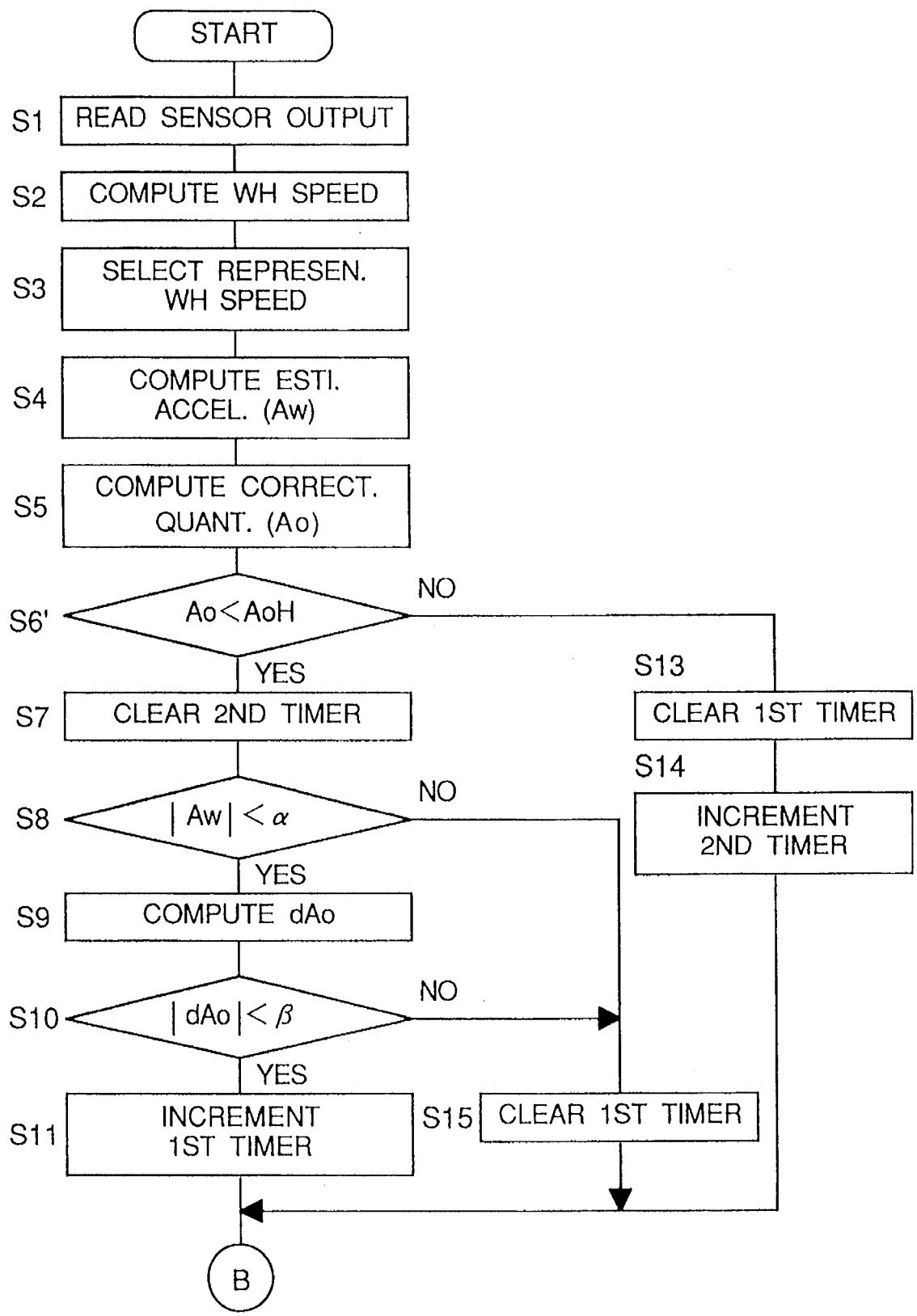
FIGS. 5 and 6 are flow-charts similar to FIGS. 2 and 3, respectively, but indicating a modification thereof.
Figure 6:
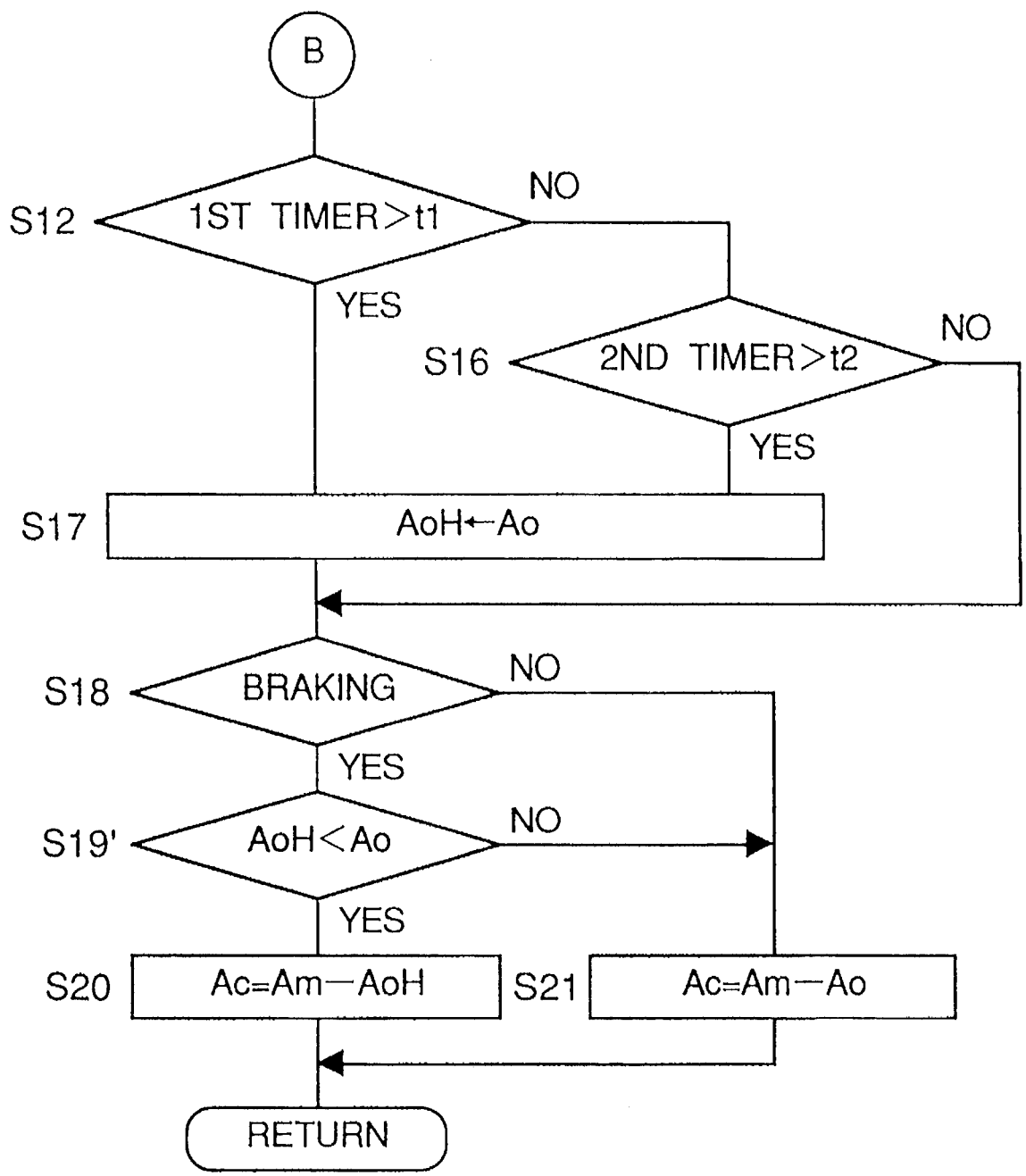

FIGS. 5 and 6 depict flow-charts indicating the operation of the gravitational accelerometer according to a modification of the first embodiment in which the acceleration sensor shown in FIG. 16 is incorporated.

The difference of these flow-charts from those of FIGS. 2 and 3 resides in step S6' in the flow-chart of FIG. 5, and step S19' in the flow-chart of FIG. 6.

At step S6', the correction quantity Ao of the accelerometer is compared with the horizontal correction quantity AoH stored in the horizontal correction quantity storage 11. If the correction quantity Ao is smaller than the horizontal correction quantity AoH, the second timer is cleared to zero at step S7. Meanwhile, if the correction quantity Ao is greater than the horizontal correction quantity AoH stored in the horizontal correction quantity storage 11, the procedure advances to step S13.

At step 19', the horizontal correction quantity AoH stored in the horizonal correction quantity storage 11 is compared with the correction quantity Ao. If the horizontal correction quantity AoH is smaller than the zero correction quantity Ao, the procedure advances to step S20. In contrast, if the correction quantity Ao is greater than the horizontal correction quantity AoH stored in the horizontal correction quantity storage 11, the procedure proceeds to step 21.

In the case where the acceleration sensor in which the output voltage is reduced upon acceleration is employed as described above, the relationship of magnitude between the correction quantity Ao and the horizontal correction quantity AoH is reversed.

Figure 7:
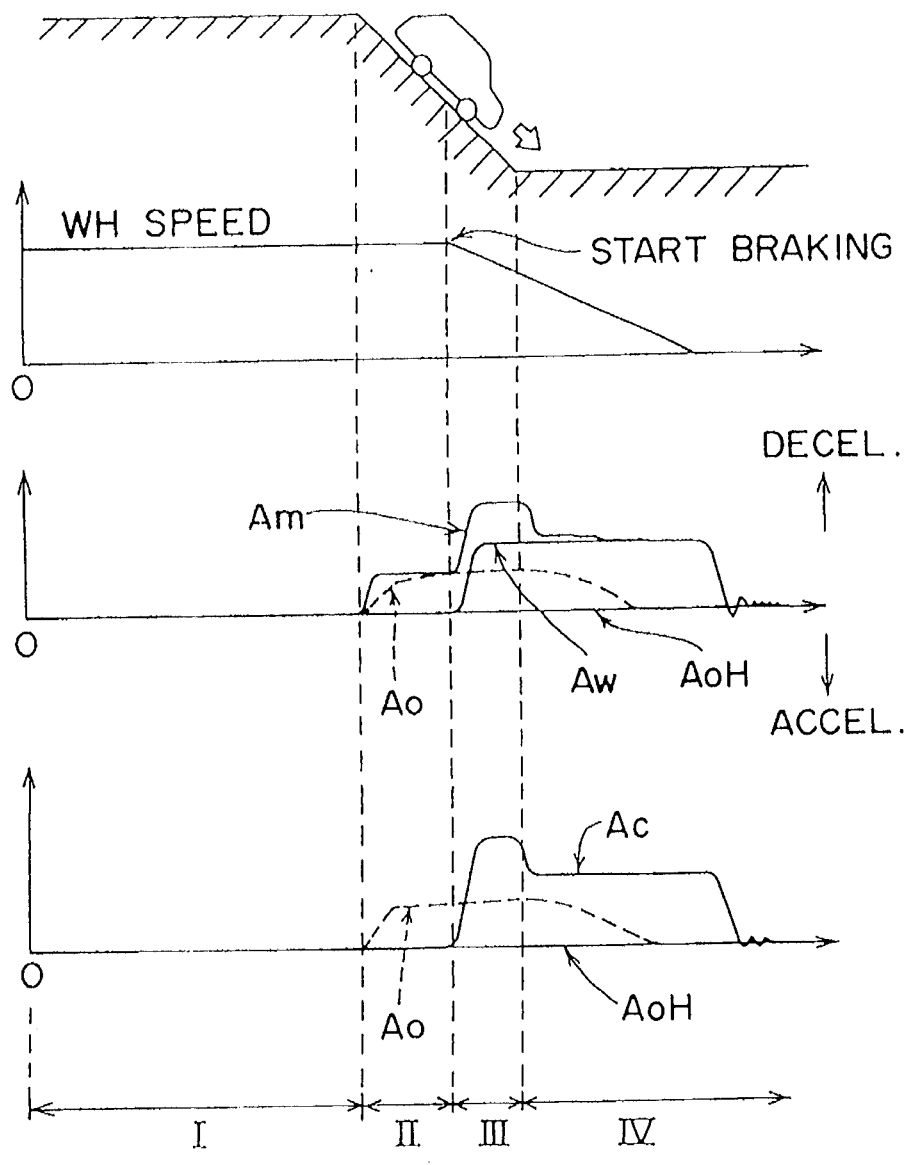
FIG. 7A is a view identical to FIG. 4A, but indicating an automotive vehicle having a gravitational accelerometer of FIGS. 5 and 6.
FIGS. 7B, 7C, and 7D are diagrams similar to FIGS. 4B, 4C, and 4D, respectively, but indicating influences on the gravitational accelerometer of FIGS. 5 and 6.

FIG. 7A shows the state wherein an automotive vehicle provided with a gravitational accelerometer having the gravitational acceleration sensor in which the output voltage is decreased upon acceleration as shown in FIG. 16, and travelling at a constant speed, starts braking in the course of a downhill and stops on a generally horizontal road after the end of the downhill.

FIG. 7B shows variation of the wheel speed. FIG. 7C represents variations of the vehicle acceleration Aw estimated by the wheel speed, acceleration Am based on the gravitational acceleration sensor, variable zero correction quantity Ao obtained for each cycle, and the horizontal correction quantity AoH. FIG. 7D denotes variation of the acceleration Ac obtained from the gravitational acceleration sensor after the correction.

The difference of the above diagrams from those of the first embodiment resides in that, since the output voltage with respect to the acceleration shows a negative characteristic in the acceleration sensor, the acceleration Am based on the acceleration sensor indicates a positive value, and thus, the variation reversed in the positive and negative characteristics is shown. Following to the above, since the estimated vehicle acceleration Aw also shows the variation reversed in the positive and negative characteristics with respect to the first embodiment, the zero correction quantity Ao and horizontal correction quantity AoH similarly show variations reversed in the positive and negative characteristics, but the function and effect similar to those in the first embodiment can be obtained.

Subsequently, referring to FIGS. 8, 9 and 10, the anti-skid control apparatus incorporated with the gravitational accelerometer according to a second embodiment of the present invention will be described hereinbelow.

Figure 8:
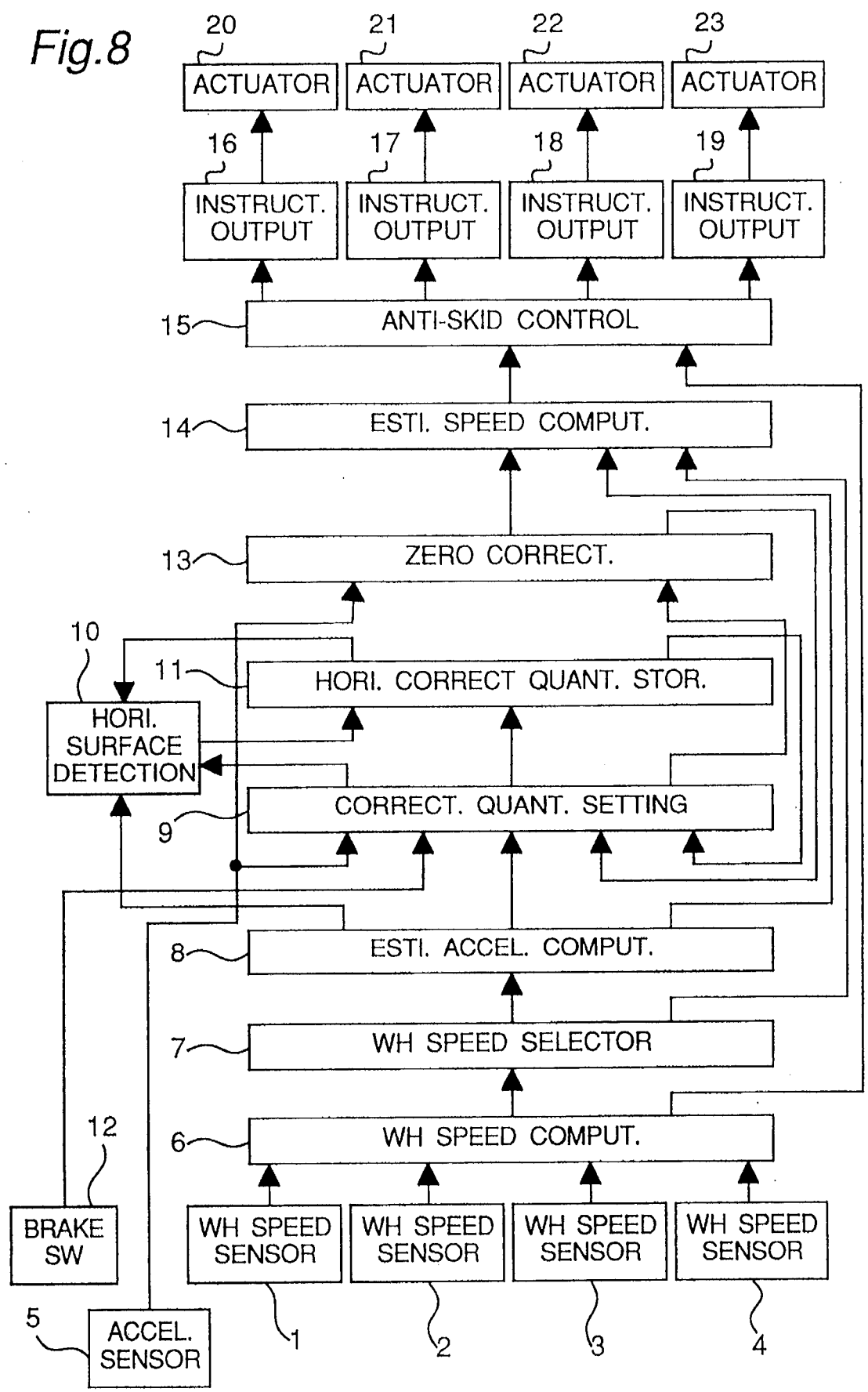
FIG. 8 is a diagram similar to FIG. 1, but according to a second embodiment of the present invention.
Figure 9:
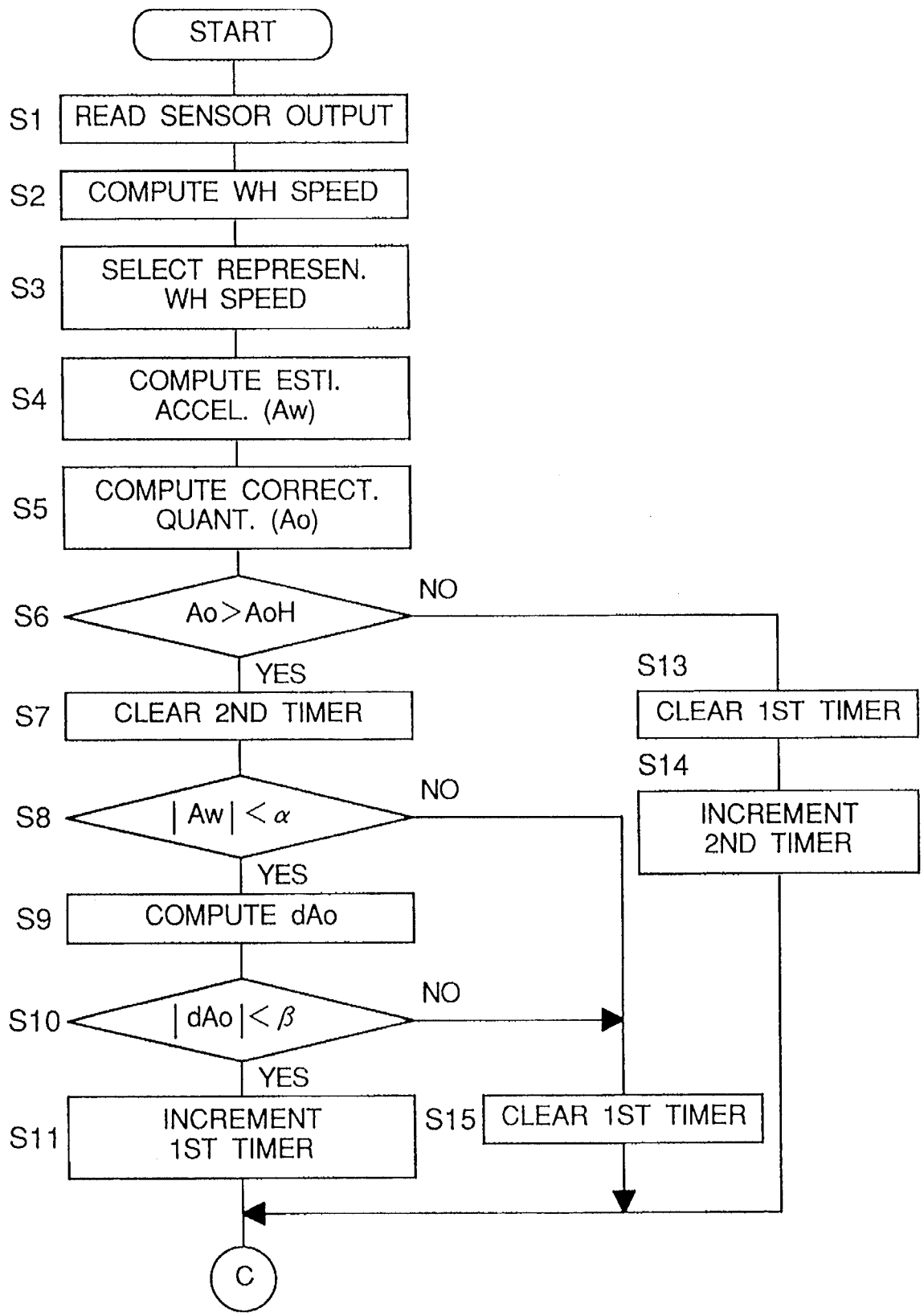
FIGS. 9 and 10 are flow-charts similar to FIGS. 2 and 3, respectively, but indicating functioning of the gravitational accelerometer of FIG. 8.
Figure 10:
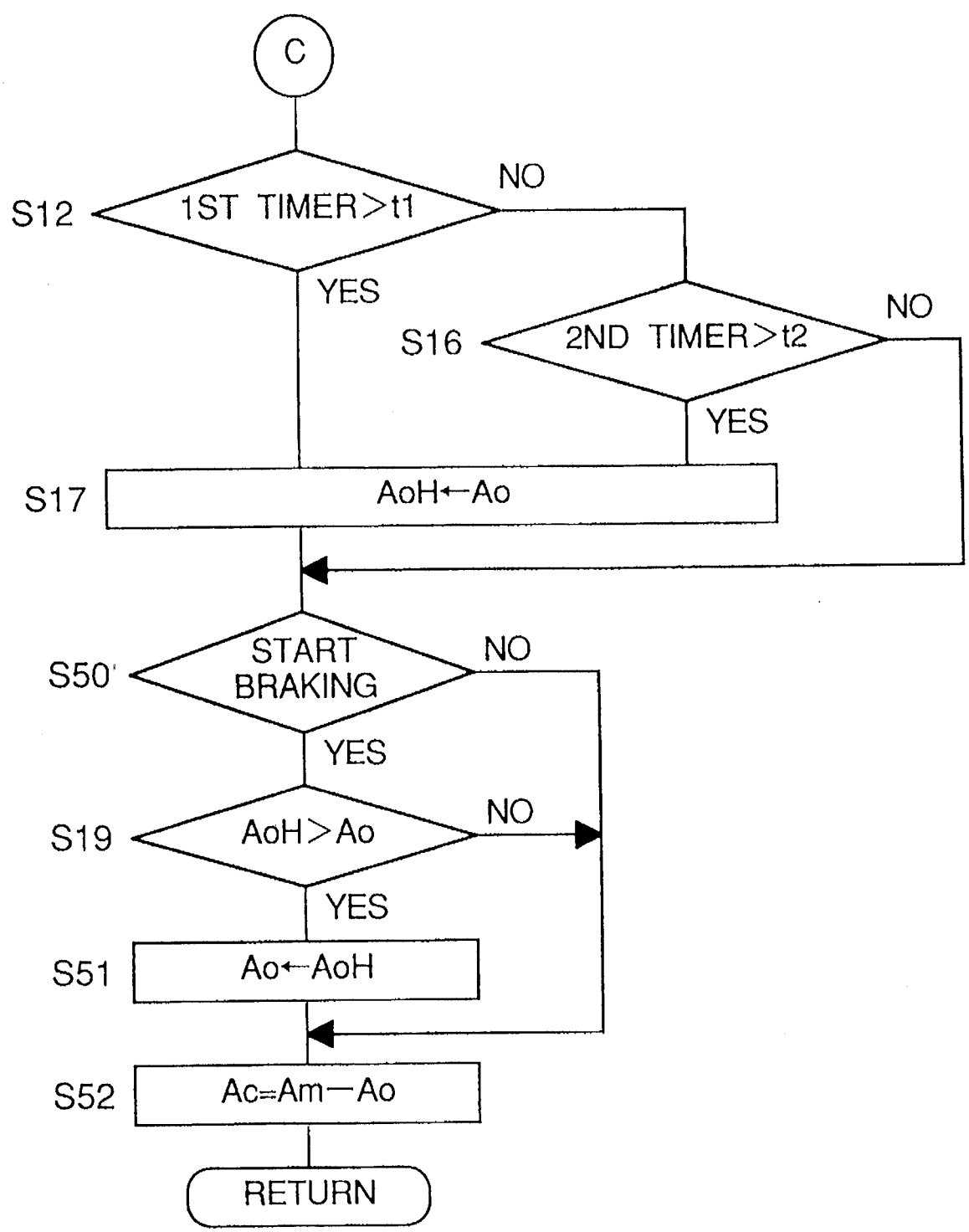

FIG. 8 shows a block diagram of the anti-skid control apparatus according to the second embodiment of the present invention, and FIGS. 9 and 10 are flow-charts representing functioning for effecting the zero correction of the accelerometer according to the second embodiment.

It is to be noted here that only the different points from the first embodiment will be explained hereinafter, with description in the same arrangements as in the first embodiment being omitted for brevity's sake.

In FIG. 8, the difference in the circuit arrangement from that of the first embodiment is such that the brake-on signal by the brake switch 12 is applied not to the zero correction unit 13, but to the correction quantity setting unit 9, and further, the horizontal correction quantity AoH stored in the horizontal correction quantity storage 11 is inputted not to the zero correction unit 13, but to the correction quantity setting unit 9.

Here, it is so arranged that, upon detection of the braking of the vehicle body by the brake switch 12, if the horizontal correction quantity AoH stored in the horizontal correction quantity storage 11 is greater than the zero correction quantity Ao, the correction quantity setting unit 9 substitutes the value of the horizontal correction quantity AoH stored in the horizontal correction quantity storage 11, for the correction quantity Ao by the correction quantity setting unit 9 only for said moment, i.e. only during one cycle for effecting the zero correction of the accelerometer.

Accordingly, with respect to the functioning for effecting the zero correction of the gravitational accelerometer, the difference of the flow-charts from those of FIGS. 2 and 3 resides in steps S50, S51 and S52 in the flow-chart of FIG. 10.

At step S50, a signal from the brake switch 12 indicating the presence or absence of braking is inputted to the correction quantity setting unit 9, and if starting of braking of the vehicle is detected, the horizontal correction quantity AoH stored in the horizontal correction quantity storage 11 is compared with the correction quantity Ao. If the horizontal correction quantity AoH is greater than the correction quantity Ao, the procedure advances to step S51.

At step S51, the correction quantity setting unit 9 outputs the horizontal correction quantity AoH stored in the horizontal correction quantity storage 11 as the correction quantity Ao. At step S52, the acceleration Ac after the correction is computed by subtracting the correction quantity Ao equal in value to the horizontal correction quantity AoH stored in the horizontal correction quantity storage 11, from the acceleration Am based on the acceleration sensor 5, at the zero correction unit 13, to thereby complete this flow.

Meanwhile, at step 850, if the starting of braking for the vehicle is not detected, the procedure advances to step S52. In the zero correction unit 13, by subtracting the correction quantity Ao computed by the predetermined calculation at the correction quantity setting unit 9, from the acceleration Am based on the acceleration sensor 5, the acceleration Ac after the correction is computed, to thereby complete this flow.

Similarly, at step S19, if the horizontal correction quantity AoH stored in the horizontal correction quantity storage 11 is smaller than the correction quantity Ao computed by the correction quantity setting unit 9, the procedure advances to step S52.

It is to be noted here that if it is desired to employ an expression to add the correction quantity Ao at step S52, exactly the same thing may be represented also by:

$$Ac=Am+Ao.$$

Figure 11:
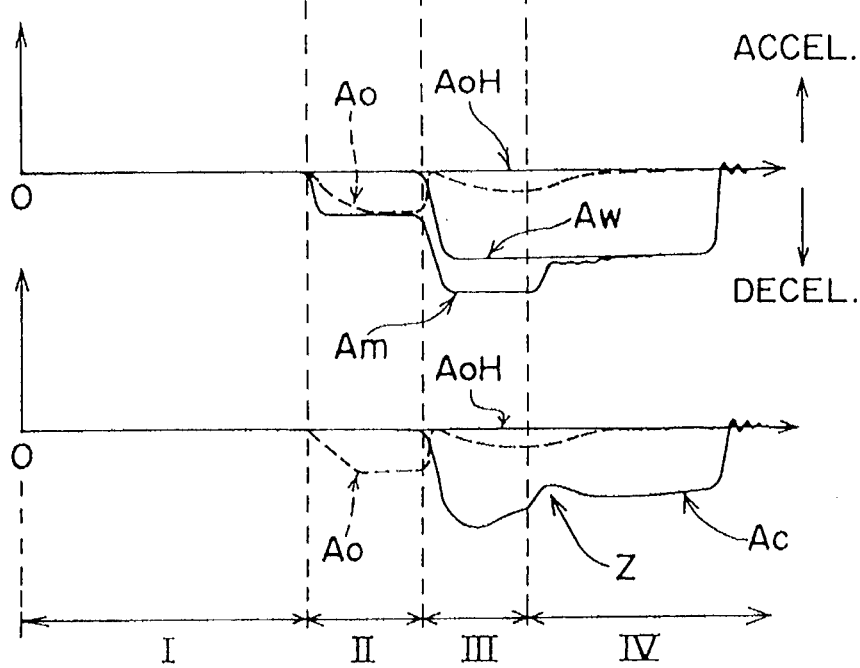
FIG. 11A is a view identical to FIG. 4A, but indicating an automotive vehicle having the gravitational accelerometer of FIG. 8.
FIGS. 11B, 11C, and 11D are diagrams similar to FIGS. 4B, 4C, and 4D, respectively, but indicating influences on the gravitational accelerometer of FIG. 8.

FIG. 11A shows the state in which the automotive vehicle provided with the gravitational accelerometer according to the second embodiment of the present invention and running at a constant speed, starts braking in the course of a downhill, and stops on a generally horizontal road after the end of the downhill.

FIG. 11B shows variation of the wheel speed. FIG. 11C represents variations of the vehicle acceleration Aw estimated by the wheel speed, acceleration Am based on the gravitational acceleration sensor 5, and variable zero correction quantity Ao obtained for each cycle, and the horizontal correction quantity AoH. FIG. 11D denotes variation of the acceleration Ac obtained from the acceleration sensor 5 after the correction.

The difference of the above arrangement from that in the first embodiment is such that as shown in FIG. 11C, upon starting of the braking, if the horizontal correction quantity AoH stored in the horizontal correction quantity storage 11 is greater than the correction quantity Ao, the value of the horizontal correction quantity AoH stored in the horizontal correction quantity storage 11 is substituted for the correction quantity Ao only for this moment.

By the above arrangement, as shown in FIGS. 11C and 11D, the correction quantity Ao becomes equal in value to the horizontal correction quantity AoH at the starting of the braking. Thereafter, at, the first half of the braking, i.e. in the region III, since the automotive vehicle is located on the downhill, the correction quantity Ao changes so as to slowly correct the inclination component of the downhill, and also, slowly approaches zero at the portion where the vehicle has been transferred onto the horizontal road, i.e. in the region IV.

Therefore, as shown in FIG. 11D, although the acceleration Ac after the correction becomes rather smaller at the point where the vehicle has been transferred onto the horizontal road, the effect similar to that in the first embodiment can be obtained since the acceleration is not so reduced as to prolong the stopping distance of the vehicle.

Figure 12:
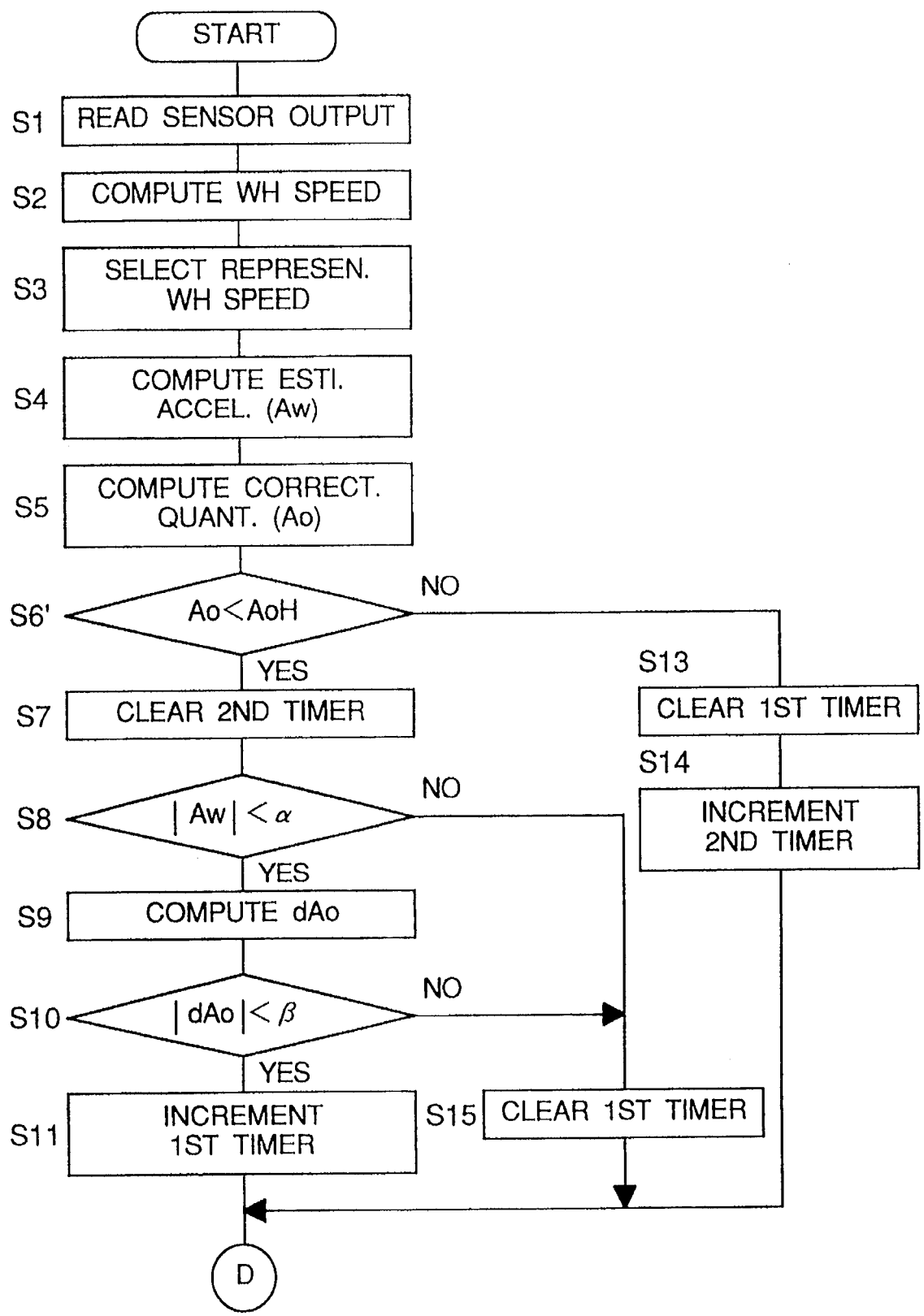
FIGS. 12 and 13 are flow-charts similar to FIGS. 2 and 3, respectively, but indicating functioning of the gravitational accelerometer according to a modification of the second embodiment.
Figure 13:
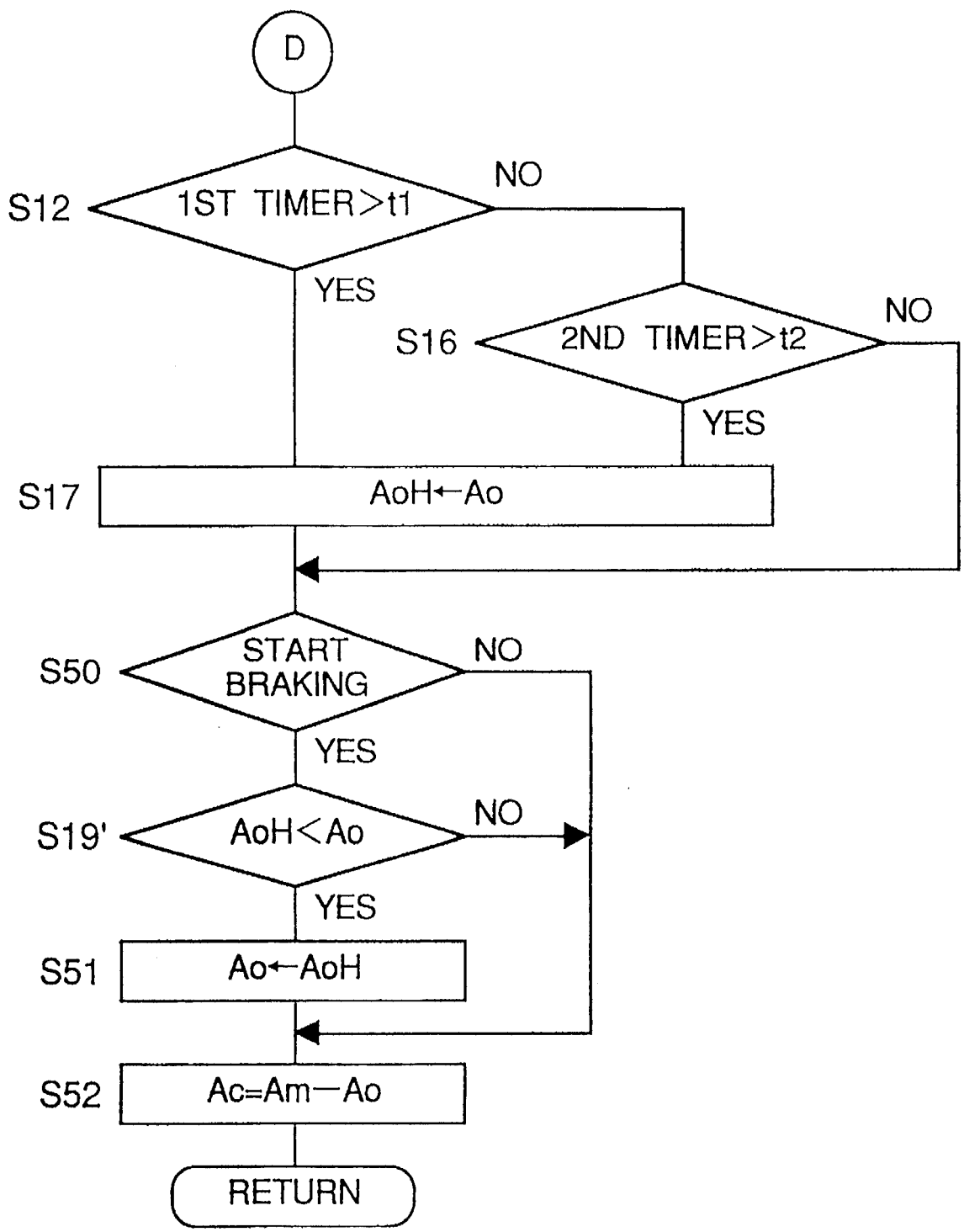

FIGS. 12 and 13 depict flow-charts indicating the operation of the gravitational accelerometer according to a modification of the second embodiment, which is internally provided with the acceleration sensor shown in FIG. 16 in which the output voltage is decreased upon acceleration.

The difference of these flow-charts from those of FIGS. 9 and 10 resides in step S6' in the flow-chart of FIG. 12 and step S19' in the flow-chart of FIG. 13.

At step S6', the zero correction quantity Ao of the accelerometer is compared with the horizontal correction quantity AoH stored in the horizontal correction quantity storage 11. If the correction quantity Ao is smaller than the horizontal correction quantity AoH, the second timer is cleared to zero at step S7. In contrast, if the correction quantity Ao is greater than the horizontal correction quantity AoH stored in the horizontal correction quantity storage 11, the procedure advances to step S13.

At step 19', the horizontal correction quantity AoH stored in the horizonal correction quantity storage 11 is compared with the correction quantity Ao, and if the horizontal correction quantity AoH is smaller than the correction quantity Ao, the procedure advances to step S51. If the horizontal correction quantity AoH stored in the horizontal correction quantity storage 11 is greater than the correction quantity Ao computed by the correction quantity setting unit 9, the procedure advances to step S52.

In the case where the acceleration sensor in which the output voltage is reduced upon acceleration is employed as described above, the relationship of magnitude between the correction quantity Ao and the horizontal correction quantity AoH is reversed.

Figure 14A:
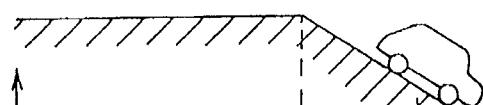
FIG. 14A is a view identical to FIG. 4A, but indicating an automotive vehicle having the gravitational accelerometer of FIGS. 12 and 13.

FIG. 14A shows the state in which an automotive vehicle provided with a gravitational accelerometer having the gravitational acceleration sensor in which the output voltage is decreased upon acceleration as shown in FIG. 16, and travelling at a constant speed, starts braking in the course of a downhill and stops on a generally horizontal road after the end of the downhill.

Figure 14B:
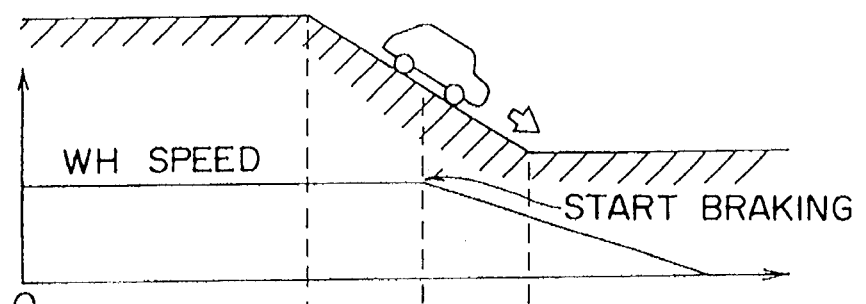
FIGS. 14B, 14C, and 14D are diagrams similar to FIGS. 4B, 4C, and 4D, respectively, but indicating influences on the gravitational accelerometer of FIGS. 12 and 13.
Figure 14C:
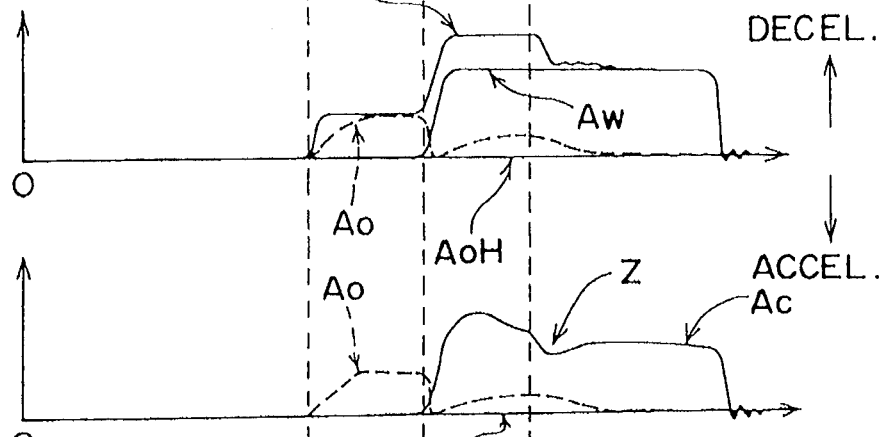
Figure 14D:
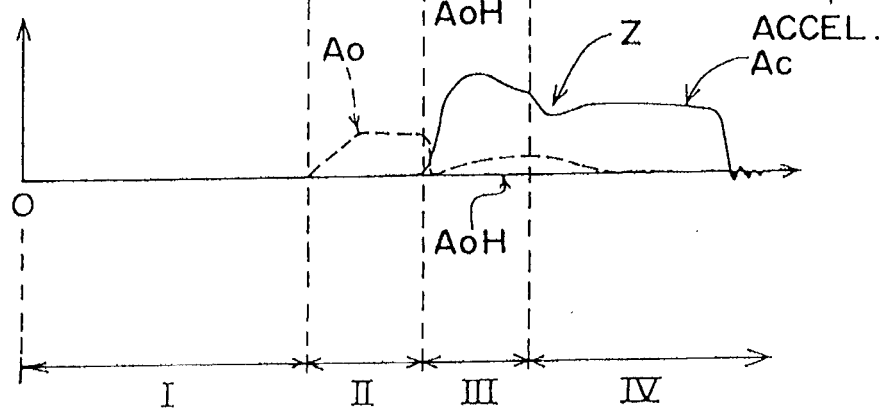

FIG. 14B shows variation of the wheel speed. FIG. 14C represents variations of the vehicle acceleration Aw estimated by the wheel speed, acceleration Am based on the gravitational acceleration sensor, variable zero correction quantity Ao obtained for each cycle, and the horizontal correction quantity AoH. FIG. 14D denotes variation of the acceleration Ac obtained from the gravitational acceleration sensor after the correction.

The difference of the above diagrams from those of the second embodiment resides in that, since the output voltage with respect to the acceleration shows a negative characteristic in the acceleration sensor, the acceleration Am based on the acceleration sensor indicates a positive value, and thus, the variation reversed in the positive and negative characteristics is shown with respect to the second embodiment. Since the estimated vehicle acceleration Aw also shows the variation reversed in the positive and negative characteristics with respect to the second embodiment, the correction quantity Ao and horizontal correction quantity AoH also show variations reversed in the positive and negative characteristics with respect to the second embodiment. However, the function and effect similar to those in the second embodiment can be obtained.

As is clear from the foregoing description, according to the gravitational accelerometer of the present invention, even when it is subjected to somewhat long-term variations due to, for example, fixing accuracy, electrical drift, and gain fluctuation, etc. of the gravitational acceleration sensor, or to influences by the inclination or gradient of the road surface, the zero correction and sensitivity correction thereof can be quickly effected. Furthermore, in the cases of sudden changes in the road surface inclination or braking in the course of a downhill or slope, there is no possibility that follow-up of the zero correction is delayed, and thus, such a problem as extension of the stopping distance, etc. can be eliminated. Accordingly, acceleration at high accuracy may be obtained for still more accurate control of automotive vehicles.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A gravitational accelerometer for use in an automotive vehicle, comprising:

a wheel speed output means for outputting a wheel speed by measuring a rotational speed of at least one of vehicle wheels;

an acceleration detection means for detecting and outputting an acceleration Am applied to the automotive vehicle;

an estimated vehicle acceleration output means for outputting an estimated vehicle acceleration Aw estimated from the wheel speed;

a correction quantity computing means for computing variable correction quantity Ao for each calculation cycle;

a road surface state detection means for detecting a generally horizontal road surface;

a horizontal correction quantity output means for outputting a horizontal correction quantity AoH, which is a correction quantity with respect to the generally horizontal road surface, in response to an output from said road surface state detection means; and a zero correction means for correcting the acceleration Am based on one of the correction quantity Ao and the horizontal correction quantity AoH to compute a corrected acceleration Ac.

2. A gravitational accelerometer for use in an automotive vehicle, comprising:

a wheel speed output means for outputting a wheel speed by measuring a rotational speed of at least one of vehicle wheels;

an acceleration detection means for detecting and outputting an acceleration Am applied to the automotive vehicle from an amount of displacement of a weight accommodated therein;

an estimated vehicle acceleration output means for outputting an estimated vehicle acceleration Aw estimated from the wheel speed;

a correction quantity computing means for computing variable correction quantity Ao for each calculation cycle;

a road surface state detection means for detecting a generally horizontal road surface;

a storage means for storing a correction quantity Ao with respect to the generally horizontal road surface as a horizontal correction quantity AoH in response to an output from said road surface state detection means; and a zero correction means for correcting the acceleration Am based on one of the correction quantity Ao and the horizontal correction quantity AoH stored in said storage means to compute a corrected acceleration Ac.

3. The gravitational accelerometer according to claim 2, wherein said road surface state detection means judges to have detected the generally horizontal road surface, when the estimated vehicle acceleration Aw is smaller than a predetermined upper limit value and a differential value of the correction quantity Ao is smaller than a predetermined upper limit value, and when a state in which the correction quantity Ao is greater than the horizontal correction quantity AoH stored in said storage means in a previous cycle has continued for a predetermined period of time, to thereby store the correction quantity Ao at that time in said storage means as a new horizontal correction quantity AoH.

4. The gravitational accelerometer according to claim 2, wherein said road surface state detection means judges to have detected the generally horizontal road surface, when the estimated vehicle acceleration Aw is smaller than a predetermined upper limit value and a differential value of the correction quantity Ao is smaller than a predetermined upper limit value, and when a state in which the correction quantity Ao is smaller than the horizontal correction quantity AoH stored in said storage means in a previous cycle has continued for a predetermined period of time, to thereby store the correction quantity Ao at that time in said storage means as a new horizontal correction quantity AoH.

5. The gravitational accelerometer according to claim 2, wherein said road surface state detection means judges to have detected the generally horizontal road surface, when a state in which the correction quantity Ao is smaller than the horizontal correction quantity AoH stored in said storage means in a previous cycle has continued for a predetermined period of time, to thereby store the correction quantity Ao at that time in said storage means as a new horizontal correction quantity AoH.

6. The gravitational accelerometer according to claim 2, wherein said road surface state detection means judges to have detected the generally horizontal road surface, when a state in which the correction quantity Ao is greater than the horizontal correction quantity AoH stored in said storage means in a previous cycle has continued for a predetermined period of time, to thereby store the correction quantity Ao at that time in said storage means as a new horizontal correction quantity AoH.

7. The gravitational accelerometer according to claim 2, wherein said zero correction means compares, during braking, the correction quantity Ao with the horizontal correction quantity AoH and selects the greater quantity for addition to or substraction from the acceleration Am, to thereby compute the corrected acceleration Ac.

8. The gravitational accelerometer according to claim 2, wherein at the starting of braking, when the horizontal correction quantity AoH is greater than the correction quantity Ao, the horizontal correction quantity AoH at that time is set to be the correction quantity Ao.

9. A zero adjuster for a gravitational accelerometer, comprising:
- a wheel speed output means for outputting a wheel speed by measuring a rotational speed of at least one of vehicle wheels;
- an estimated vehicle acceleration output means for outputting an estimated vehicle acceleration Aw estimated from the wheel speed;
- an acceleration detection means for detecting and outputting an acceleration Am applied to the automotive vehicle;
- a correction quantity computing means for computing variable correction quantity Ao for each calculation cycle;
- a road surface state detection means for detecting a generally horizontal road surface;
- a horizontal correction quantity output means for outputting a horizontal correction quantity AoH, which is a correction quantity with respect to the generally horizontal road surface, in response to an output from said road surface state detection means; and
- a corrected acceleration computing means for correcting the acceleration Am based on one of the correction quantity Ao and the horizontal correction quantity AoH to compute a corrected acceleration Ac.

10. A zero adjuster for a gravitational accelerometer, comprising:
- a wheel speed output means for outputting a wheel speed by measuring a rotational speed of at least one of vehicle wheels;
- an estimated vehicle acceleration output means for outputting an estimated vehicle acceleration Aw estimated from the wheel speed;
- an acceleration detection means for detecting and outputting an acceleration Am applied to the automotive vehicle;
- a correction quantity computing means for computing variable correction quantity Ao for each calculation cycle;
- a road surface state detection means for detecting a generally horizontal road surface;
- a storage means for storing a correction quantity Ao with respect to the generally horizontal road surface as a horizontal correction quantity AoH in response to an output from said road surface state detection means; and
- a corrected acceleration computing means for correcting the acceleration Am based on one of the correction quantity Ao and the horizontal correction quantity AoH stored in said storage means to compute a corrected acceleration Ac.

11. The zero adjuster according to claim 10, wherein said road surface state detection means judges to have detected the generally horizontal road surface, when the estimated vehicle acceleration Aw is smaller than a predetermined upper limit value and a differential value of the correction quantity Ao is smaller than a predetermined upper limit value, and when a state in which the correction quantity Ao is greater than the horizontal correction quantity AoH stored in said storage means in a previous cycle has continued for a predetermined period of time, to thereby store the correction quantity Ao at that time in said storage means as a new horizontal correction quantity AoH.

12. The zero adjuster according to claim 10, wherein said road surface state detection means judges to have detected the generally horizontal road surface, when the estimated vehicle acceleration Aw is smaller than a predetermined upper limit value and a differential value of the correction quantity Ao is smaller than a predetermined upper limit value, and when a state in which the correction quantity Ao is smaller than the horizontal correction quantity AoH stored in said storage means in a previous cycle has continued for a predetermined period of time, to thereby store the correction quantity Ao at that time in said storage means as a new horizontal correction quantity AoH.

13. The zero adjuster according to claim 10, wherein said road surface state detection means judges to have detected the generally horizontal road surface, when a state in which the correction quantity Ao is smaller than the horizontal correction quantity AoH stored in said storage means in a previous cycle has continued for a predetermined period of time, to thereby store the correction quantity Ao at that time in said storage means as a new horizontal correction quantity AoH.

14. The zero adjuster according to claim 10, wherein said road surface state detection means judges to have detected the generally horizontal road surface, when a state in which the correction quantity Ao is greater than the horizontal correction quantity AoH stored in said storage means in a previous cycle has continued for a predetermined period of time, to thereby store the correction quantity Ao at that time in said storage means as a new horizontal correction quantity AoH.

15. The zero adjuster according to claim 10, wherein said zero correction means compares, during braking, the correction quantity Ao with the horizontal correction quantity AoH and elects the greater quantity for addition to or substraction from the acceleration Am, to thereby compute the corrected acceleration Ac.

16. The zero adjuster according to claim 10, wherein at the starting of braking, when the horizontal correction quantity AoH is greater than the correction quantity Ao, the horizontal correction quantity AoH at that time is set to be the correction quantity Ao.

17. The gravitational accelerometer according to claim 1, said road surface state detection means comprising a first timer and a second timer.

18. The gravitational accelerometer according to claim 2, said road surface state detection means comprising a first timer and a second timer.

19. The gravitational accelerometer according to claim 9, said road surface state detection means comprising a first timer and a second timer.

20. The gravitational accelerometer according to claim 10, said road surface state detection means comprising a first timer and a second timer.

* * * * *

UNITED STATES PATENT AND TRADEMARK OFFICE
CERTIFICATE OF CORRECTION

PATENT NO. : 5,526,263
DATED : June 11, 1996
INVENTOR(S) : H. TANAKA et al.

It is certified that error appears in the above-indentified patent and that said Letters Patent is hereby corrected as shown below:

On the cover, in section [75], "Inventors", line 2, change "Itami" to ---Itami-shi---.

At column 16, line 40 (claim 15, line 4), change "elects" to ---selects---.

At column 16, line 41 (claim 15, line 5), change "substraction" to ---subtraction---.

Signed and Sealed this

Sixteenth Day of September, 1997

Attest:

BRUCE LEHMAN

*Attesting Officer*    *Commissioner of Patents and Trademarks*